(12) United States Patent
Li et al.

(10) Patent No.: US 10,026,998 B2
(45) Date of Patent: Jul. 17, 2018

(54) ELECTRIC VEHICLE OPERATION TO MANAGE BATTERY CAPACITY

(71) Applicant: Ford Global Technologies, LLC, Dearborn, MI (US)

(72) Inventors: Yonghua Li, Ann Arbor, MI (US); Fling Tseng, Ann Arbor, MI (US); Szushen Ho, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 478 days.

(21) Appl. No.: 14/278,011

(22) Filed: May 15, 2014

(65) Prior Publication Data
US 2015/0329003 A1 Nov. 19, 2015

(51) Int. Cl.
*H02J 7/00* (2006.01)
*H01M 10/44* (2006.01)
(Continued)

(52) U.S. Cl.
CPC ............... *H01M 10/44* (2013.01); *B60L 3/12* (2013.01); *B60L 11/14* (2013.01); *B60L 11/1816* (2013.01); *B60L 11/1838* (2013.01); *B60L 11/1857* (2013.01); *B60L 11/1862* (2013.01); *H02J 7/0077* (2013.01); *B60L 2240/545* (2013.01); *B60L 2240/547* (2013.01); *B60L 2240/549* (2013.01); *B60L 2240/70* (2013.01); *B60L 2260/46* (2013.01); *H01M 2220/20* (2013.01); *Y02T 10/70* (2013.01); *Y02T 10/705* (2013.01); *Y02T 10/7005* (2013.01); *Y02T 10/7044* (2013.01); *Y02T 10/7072* (2013.01);
(Continued)

(58) Field of Classification Search
CPC ... H02J 7/0077; H01M 10/44; B60L 11/1861; B60L 11/1862
USPC .................................................. 320/132, 134
See application file for complete search history.

(56) References Cited

U.S. PATENT DOCUMENTS 5,596,260 A * 1/1997 Moravec ............ G01R 31/3651
320/135
6,337,560 B1 * 1/2002 Kalogeropoulos ... H02J 7/0073
320/125
(Continued)

FOREIGN PATENT DOCUMENTS

JP 2011259652 A 12/2011

OTHER PUBLICATIONS

Pang et al. "BEVs/PHEVs as Dispered Energy Storage for V2B Uses in teh Smart Grid" 10 page.*
(Continued)

*Primary Examiner* — Nathaniel Pelton
(74) *Attorney, Agent, or Firm* — David B. Kelley; Brooks Kushman P.C.

(57) ABSTRACT

Battery state of charge control systems and methods provide techniques to assist in managing battery capacity and battery life under various environmental, operating, and storage conditions. Dynamic management of desired battery SOC based on one or more parameters associated with usage patterns and environmental conditions, e.g., charge/discharge patterns, state of charge and/or temperature during storage may extend useful battery life. The present techniques can provide active state of charge monitoring and control to manage battery capacity during storage or other periods of non-use over the battery life to enhance battery performance.

20 Claims, 14 Drawing Sheets

(51) Int. Cl.
*B60L 11/18* (2006.01)
*B60L 3/12* (2006.01)
*B60L 11/14* (2006.01)

(52) U.S. Cl.
CPC ........ *Y02T 10/7077* (2013.01); *Y02T 10/7291* (2013.01); *Y02T 90/14* (2013.01); *Y02T 90/16* (2013.01)

(56) References Cited

U.S. PATENT DOCUMENTS

| | | | |
|---|---|---|---|
| 7,360,615 | B2 | 4/2008 | Salman et al. |
| 7,698,078 | B2 | 4/2010 | Kelty et al. |
| 7,971,227 | B1* | 6/2011 | Marko ................. H04H 20/426 370/394 |
| 2001/0024104 | A1* | 9/2001 | Suzuki .................... B60K 6/48 320/104 |
| 2008/0084186 | A1* | 4/2008 | Elder ..................... B60K 6/365 320/132 |
| 2011/0115441 | A1* | 5/2011 | Matsuyama .......... H01M 10/44 320/150 |
| 2011/0163722 | A1 | 7/2011 | Gale et al. |
| 2011/0166731 | A1 | 7/2011 | Kristinsson et al. |
| 2011/0191220 | A1 | 8/2011 | Kidston et al. |
| 2011/0204720 | A1 | 8/2011 | Ruiz et al. |
| 2011/0245987 | A1 | 10/2011 | Pratt et al. |
| 2011/0313603 | A1 | 12/2011 | Laberteaux et al. |
| 2012/0181854 | A1* | 7/2012 | Gopalakrishnan .. B60L 11/1861 307/9.1 |
| 2012/0262125 | A1* | 10/2012 | Fassnacht ............. B60L 3/0046 320/162 |
| 2012/0316810 | A1* | 12/2012 | Syed .................... H01M 10/42 702/63 |
| 2013/0009648 | A1* | 1/2013 | Tae .................... G01R 31/3278 324/503 |
| 2014/0062398 | A1* | 3/2014 | Satake ................ B60L 11/1809 320/109 |
| 2014/0125281 | A1* | 5/2014 | Mitsutani .............. H01M 10/48 320/109 |
| 2014/0266227 | A1* | 9/2014 | Harman .............. H01M 10/425 324/427 |
| 2015/0239365 | A1* | 8/2015 | Hyde .................. B60L 11/1861 701/2 |
| 2015/0258911 | A1* | 9/2015 | Sugiyama ................ B60L 1/00 701/22 |

OTHER PUBLICATIONS

Pang, et al., IEEE, Power System Engineering Research Center (PSERC), Project T-40, Texas A&M University, "BEVs/PHEVs as Dispersed Energy Storage for V2B Uses in the Smart Grid."
News Release, Oct. 13, 2011, "IBM and EKZ Make Electric Vehicle Charging More Convenient with New Smartphone Application."
Kandler Smith, et al., IEEE ASTR, Oct. 6, 2010, "Design of Electric Drive Vehicle Batteries for Long Life and Low Cost."
Kamama, A., IEEE Xplore, PowerTech 2011 IEEE Trondheim, Jun. 19-23, 2011, "Optimal management of battery charging of electric vehicles: A new microgrid feature."

* cited by examiner

ELECTRIC VEHICLE OPERATION TO MANAGE BATTERY CAPACITY

TECHNICAL FIELD

Various embodiments relate to a hybrid electric vehicle and a method for controlling state of charge in a battery in response to ambient and operating conditions to manage battery capacity.

BACKGROUND

Hybrid electric vehicles (HEV's) utilize a combination of an internal combustion engine and an electric motor to provide the power needed to propel a vehicle. This arrangement provides improved fuel economy over a vehicle that has only an internal combustion engine. Electrical energy for the electric motor is stored in a battery. Operation strategy of the vehicle and certain storage conditions may impact the life of the battery.

SUMMARY

Various systems and methods are described herein that manage battery capacity under various environmental, operating, and storage conditions, particularly for batteries for hybrid vehicles. The methods and systems may set a desired state of charge (SOC) based on these conditions to manage battery capacity and reduce the effect of these parameters on battery capacity and battery life.

In an example, an electric vehicle control method includes receiving at least one of ambient temperature, weather forecast, regional average daily temperature data, projected energy usage, storage time, projected storage time, or combinations thereof. The method can determine a desired or target state of charge (SOC) storage point for a battery using at least one of the ambient temperature, projected energy usage, and storage time to manage battery capacity and reduce the effect of these parameters on battery capacity variation. The method may allow a user to activate dynamic battery capacity management to ameliorate the effect of operating or environmental conditions on battery capacity and battery life.

In an example, the method further includes storing a SOC versus battery capacity profile that may be used to select a desired or target SOC and/or adjust operating parameters to reduce or eliminate the effect of operating and/or environmental conditions on battery capacity and battery life. The profile may be used to determine a rate of change of battery capacity based on one or more operating or ambient conditions.

In an example, the method further includes receiving the projected energy usage that includes a predicted daily or weekday driving pattern energy usage and modifying the charging SOC target to manage battery capacity.

In an example, the method further includes determining a charging start time such that the battery is charged to a target SOC shortly before scheduled operation of the vehicle. The storage time spent at the target SOC may be selected and may vary based on the target SOC, e.g., limited to a first duration of about 30 minutes or less for a first target SOC, and a second duration, which may be unlimited, for a second target SOC.

In an example, the method further includes determining a feedback charge amount to send to electrical grid from the battery to reduce the SOC to the target SOC, which may be a range of SOC values.

In an example, the method further includes partitioning the energy usage into a plurality of time based patterns.

In an example, the method further includes setting the SOC storage point to a specified ratio of a maximum SOC based on ambient temperature being below a threshold, i.e. setting the SOC storage point to at least 90% of maximum SOC when the ambient temperature is less than 0° C.

An example of an electric vehicle charge control method can include storing vehicle usage patterns, storing a favorable state of charge (SOC) profile associated with desired battery capacity, and controlling vehicle operation to an SOC set point for a first vehicle usage pattern based on ambient temperature and the favorable SOC profile. In an example, the electric vehicle is a plug-in, hybrid electric vehicle (PHEV).

In an example, the method further includes returning the state of charge set point to a default state of charge set point for a second vehicle usage pattern.

In an example, the method further includes determining a long-term storage pattern and setting the SOC to a charge-sustaining point in the favorable SOC profile.

In an example, the method further includes storing a vehicle usage pattern that has a long-term storage pattern and discharging energy back to a power grid to achieve a desired SOC associated with a sufficient charge to start the engine in the favorable SOC profile.

In an example, the method further includes sending a command to charge the battery to a full state of charge or maximum operation SOC at an end of the long term storage.

Systems and vehicles that perform the above methods are also within the scope of the present disclosure.

In an example apparatus, e.g., a hybrid electric vehicle, can include a battery to power an electric motor to propel the vehicle, wherein the battery includes a SOC, a memory storing a battery temperature, projected energy usage and storage time, a processor operatively coupled to the memory, the processor to determine a SOC storage point for the battery using the ambient temperature, projected energy usage and storage time to manage battery capacity and associated battery life.

In an example, an apparatus can include a memory to store a SOC profile that includes desired or undesirable SOC values or regions to facilitate battery capacity and associated battery life management.

In an example, an apparatus can include a processor to receive the projected energy usage that includes a predicted weekday driving pattern energy usage and to modify the charging SOC target to dynamically manage battery capacity by selecting an SOC target based on the predicted driving pattern energy usage.

In an example, an apparatus can include a processor to determine a charging start time such that the battery is charged to a target SOC shortly before operation of the vehicle.

In an example, an apparatus can include a processor to determine a feedback charge amount to send to an electrical grid from the battery to reduce or lower the SOC to a desired SOC.

In an example, an apparatus can include a processor to partition the energy usage into a plurality of time based patterns.

In an example, an apparatus can include a processor to set the SOC storage point to at least 90% of maximum SOC when the ambient temperature is less than 0° C.

In an example, an apparatus can include a memory that is updated through an external computing device after the battery is deployed. Accordingly, desired or undesirable SOC values or regions can be updated if/when new data becomes available. Thus, testing of the battery or similar batteries and their performance may continue and be used to update values and enhance vehicle performance throughout the vehicle's life.

DETAILED DESCRIPTION

The present application describes and illustrates various representative embodiments; however, it is to be understood that the disclosed embodiments are merely exemplary and may be implemented in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for example applications. Various combinations and modifications of the features consistent with the teachings of this disclosure, however, could be desired for particular applications or implementations.

Electric vehicles, plug-in electric vehicles, hybrid-electric vehicle all include a battery. The chemistries of a battery can result in charge storage or capacity losses when the battery is at certain states and in certain environments. It is desirable to manage battery capacity and extend the life of the battery as much as possible while continuing to provide adequate performance of the vehicle for a user. The present disclosure identifies some conditions that affect battery capacity, e.g., storage at a certain state of charge. Systems and methods are disclosed to control vehicle operation and provide relevant information to the vehicle operator to dynamically manage battery capacity in an attempt to extend battery life, which may depend on a type of battery, vehicle usage, and a vehicle storage pattern, for example.

Figure 1:
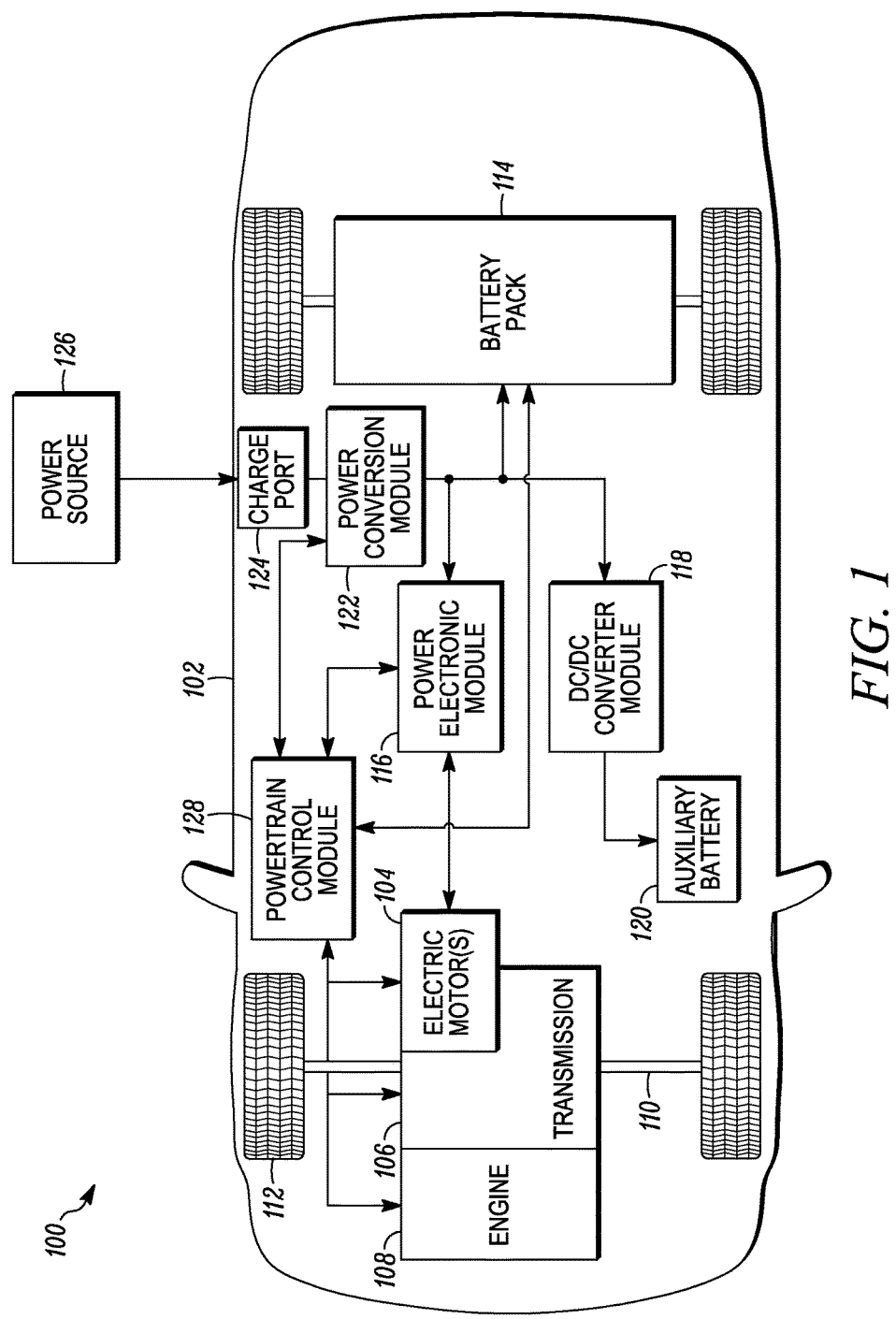
FIG. 1 is an example hybrid-electric vehicle.

FIG. 1 shows an example of a representative embodiment of a hybrid-electric vehicle (HEV) 102 that includes various strategies to manage battery capacity and battery life according to this disclosure. An HEV, which can be a plug-in hybrid-electric vehicle (PHEV), 102 may include one or more electric motors 104 mechanically connected to a hybrid transmission 106. In addition, the hybrid transmission 106 is mechanically connected to an engine 108, for example an internal combustion engine. The hybrid transmission 106 may also be mechanically connected to a drive shaft 110 that is mechanically connected to the wheels 112. The electric motors 104 can provide propulsion when the engine 108 is turned on. The electric motors 104 can provide deceleration capability when the engine 108 is turned off. The electric motors 104 may be configured as generators and can provide fuel economy benefits by recovering energy that would normally be lost as heat in the friction braking system. The electric motors 104 may also reduce vehicle emissions since the hybrid electric vehicle 102 may be operated in electric mode under certain conditions.

The traction battery or battery pack 114 stores energy that can be used by the electric motors 104. A vehicle battery pack 114 may provide a high voltage DC output. The battery pack 114 is electrically connected to a power electronics module 116. The power electronics module 116 is also electrically connected to the electric motors 104 and provides the ability to bi-directionally transfer energy between the battery pack 114 and the electric motors 104. An example battery pack 14 may provide a DC voltage while the electric motors 104 may require a three-phase AC current to function. The power electronics module 116 may convert the DC voltage to a three-phase AC current as required by the electric motors 104, for example, by using an inverter module. In a regenerative mode, the power electronics module 116 will convert the three-phase AC current from the electric motors 104 acting as generators to the DC voltage required by the battery pack 114, also using an inverter module or other circuitry. The methods described herein are equally applicable to a pure electric vehicle or any other device or vehicle using a battery pack.

In addition to providing energy for propulsion, the battery pack 114 may provide energy for other vehicle electrical systems. An electrical system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In an example vehicle, the low voltage systems may be electrically connected to a 12V battery 120. An all-electric vehicle may have a similar architecture but without the engine 108.

The battery pack 114 may be recharged by an external power source 126, such as an electric utility grid. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122. The power conversion module may condition the power from the external power source 126 to provide the proper voltage and current levels to the battery pack 114. In some applications, the external power source 126 may be configured to provide the proper voltage and current levels to the battery pack 114 and, hence, the power conversion module 122 may not be necessary. The functions of the power conversion module 122 may reside in the external power source 126 in some applications. The vehicle engine, transmission, electric motors, battery, power conversion and power electronics may be controlled by a powertrain control module (PCM) 128.

Figure 2:
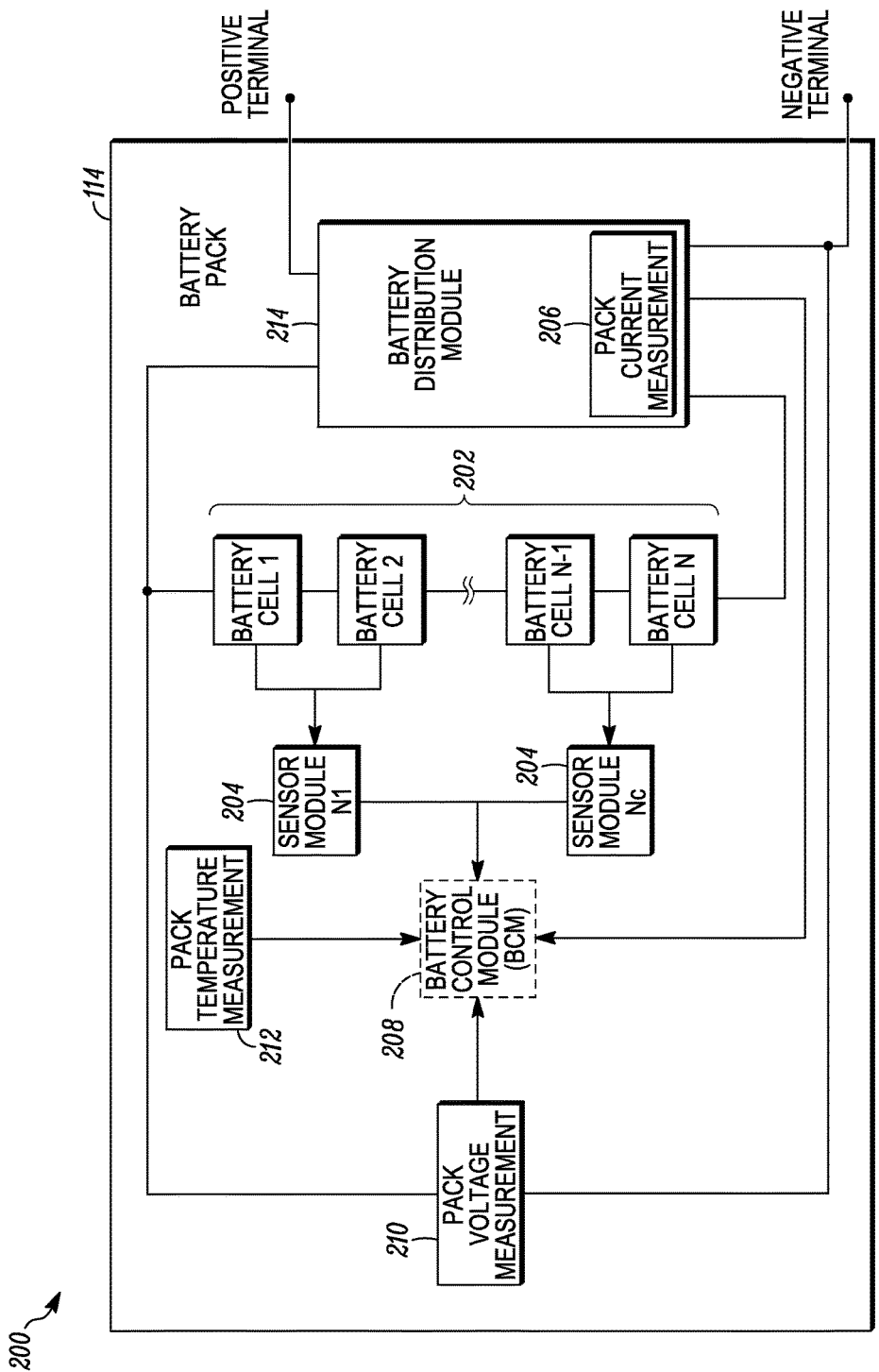
FIG. 2 is a battery pack arrangement including battery cells and battery cell monitoring and controlling systems.

In one embodiment PCM 128 cooperates with one or more controllers and/or electronics such as illustrated in FIG. 2, for example, to dynamically manage capacity of battery pack 114. PCM 128 may control charging and discharging of battery pack 114 to achieve a target battery state of charge (SOC). The target or desired SOC may vary in response to at least one of ambient temperature, projected energy usage, and storage time, for example. PCM 128 may be operatively coupled to a memory that stores a state of charge profile that includes the target SOC values based on at least one of the ambient or operating parameters. In various embodiments, PCM 128 may control discharging of battery pack 114 through charge port 124 to power source 126 and/or electric utility grid 127 to reduce current battery SOC to a desired or target SOC. Alternatively, or in combination, current battery SOC may be reduced by controlling operation of one or more electrical accessories using PCM 128 to discharge the battery to a desired SOC. Similarly, PCM 128 may control charging of battery pack 114 from power source 126 and/or from engine 108 and electric motor(s) 104 to increase battery SOC to a desired or target SOC that varies in response to vehicle and/or ambient operating parameters or conditions.

In addition to illustrating a plug-in hybrid vehicle, FIG. 1 can illustrate a battery electric vehicle (BEV) if engine 108 is removed. Likewise, FIG. 1 can illustrate a traditional hybrid electric vehicle (HEV) or a power-split hybrid electric vehicle if components 122, 124, and 128 are removed. FIG. 1 also illustrates the high voltage system which includes the electric motor(s), the power electronics module 116, the DC/DC converter module 118, the power conversion module 122, and the battery pack 114. The high voltage system and battery pack includes high voltage components including bus bars, high voltage connectors, high voltage wires, and circuit interrupt devices.

The individual battery cells within a battery pack can be constructed from a variety of chemical formulations. Battery pack chemistries may include but are not limited to lead acid, nickel cadmium (NiCd), nickel-metal hydride (NIMH), Lithium-Ion or Lithium-Ion polymer. FIG. 2 shows an example battery pack 200 in a simple series configuration of N battery cell modules 202. The battery cell modules 202 may contain a single battery cell or multiple battery cells electrically connected in parallel. The battery pack, however, may be composed of any number of individual battery cells and battery cell modules connected in series or parallel or some combination thereof. A system may have one or more controllers, such as a Battery Control Module (BCM) 208 that monitors and controls the performance of the battery pack 200. The BCM 208 may monitor several battery pack level characteristics such as pack current measured by a current sensor 206, pack voltage 210 and pack temperature 212. The accuracy of the current sensor may be useful to estimate the battery state of charge and capacity. A current sensor may utilize a variety of methods based on physical principles to detect the current including a Hall effect IC sensor, a transformer or current clamp, a resistor in which the voltage is directly proportional to the current through it, fiber optics using an interferometer to measure the phase change in the light produced by a magnetic field, or a Rogowski coil. In the event a battery cell is charging or discharging such that the current entering or exiting the battery cell exceeds a threshold, the battery control module may disconnect the battery cell via the use of a circuit interrupt device (CID) such as a fuse or circuit breaker.

In addition to the pack level characteristics, there may be battery cell level characteristics that are to be measured and monitored. For example, the terminal voltage, current, and temperature of each cell or subsets of representative cells may be measured. A system may use a sensor module 204 to measure the characteristics of one or more battery cell modules 202. The characteristics may include battery cell voltage, temperature, age, number of charge/discharge cycles, etc. A sensor module will measure battery cell voltage. Battery cell voltage may be voltage of a single battery or of a group of batteries electrically connected in parallel or in series. The battery pack 200 may utilize up to Nc sensor modules 204 to measure the characteristics of all the battery cells 202. The sensor module 204 may transfer the measurements to the BCM 208 for further processing and coordination. The sensor module 204 may transfer signals in analog or digital form to the BCM 208. The battery pack 200 may also contain a battery distribution module (BDM) 214 which controls the flow of current into and out of the battery pack 200. These sensors may sense variables that relate to battery capacity and determining a current SOC and/or desired SOC to dynamically manage battery capacity as described in this disclosure. For example, it is believed that lithium-ion battery capacity is closely related to operating and storage temperature, state of charge, and battery life time. Examples are described with reference to FIGS. 4-6.

Figure 3:
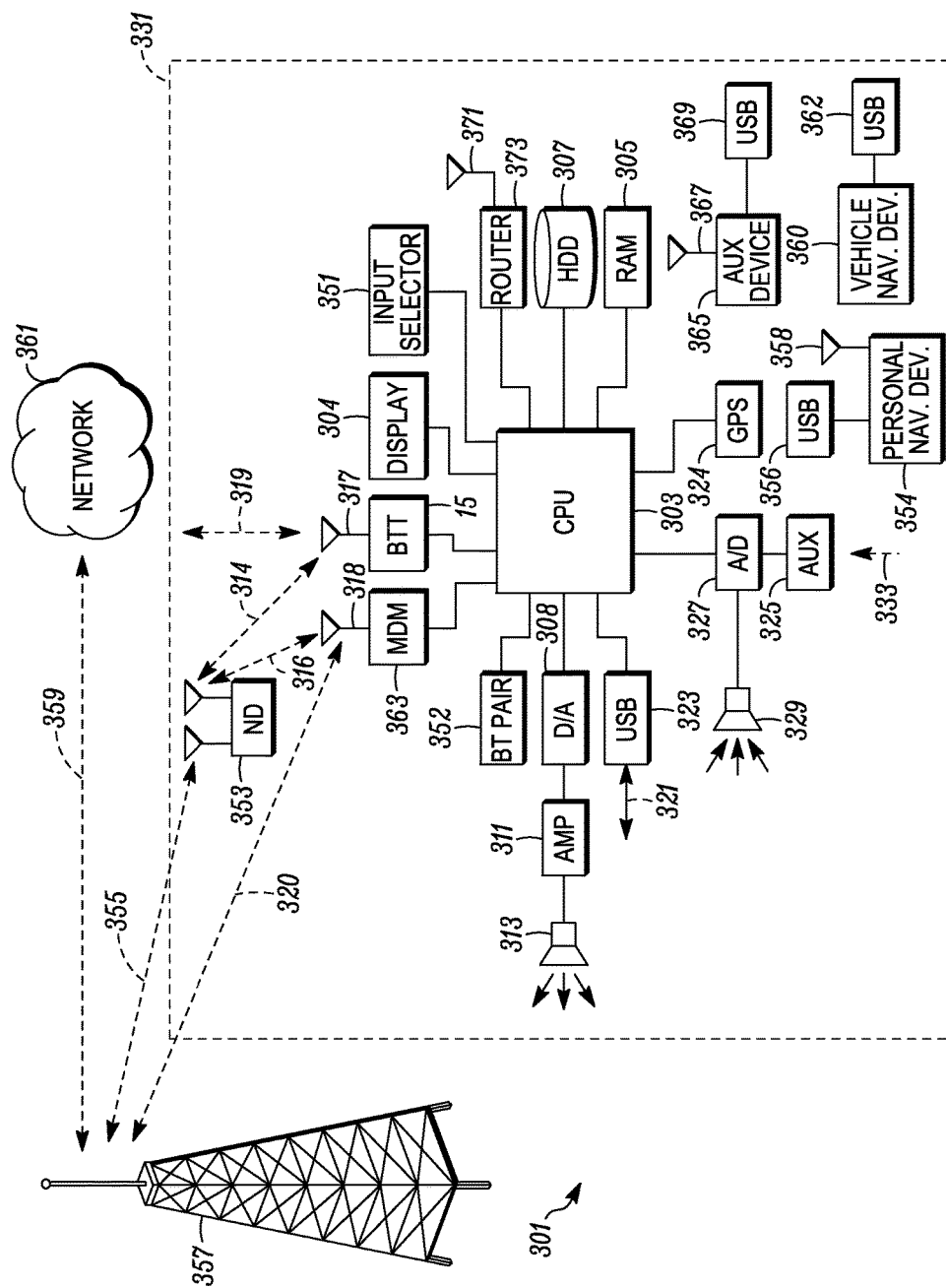
FIG. 3 shows an example block topology for a vehicle based computing system.

FIG. 3 shows an example block topology for a vehicle based computing system 301 (VCS) for a vehicle 102. An example of such a vehicle-based computing system 301 is the SYNC system manufactured by FORD MOTOR COMPANY. A vehicle enabled with a vehicle-based computing system may contain a visual front end interface that can be output on a display 304 located in the vehicle. The user may also be able to interact with the interface if it is provided, for example, with a touch sensitive screen. In another illustrative embodiment, the interaction occurs through button presses, audible speech, and speech synthesis.

Computing system 301 includes a processor 303 (e.g., CPU or other circuitry) that executes stored instructions as a specific computing device and can control at least some portion of the operation of the vehicle-based computing system. Provided within the vehicle, the processor allows onboard processing of commands and routines. Further, the processor is connected to both non-persistent storage 305 and persistent storage 307. In this illustrative embodiment, the non-persistent storage is random access memory (RAM) and the persistent storage is a hard disk drive (HDD) or flash memory.

The processor 303 is also provided with a number of different inputs allowing the user to interface with the processor. In this illustrative embodiment, a microphone 329, an auxiliary input 325 (for input 333), a USB input 323, a GPS input 324 and a BLUETOOTH input 315 are all provided. An input selector 351 is also provided, to allow a user to swap between various inputs. Input to both the microphone and the auxiliary connector is converted from analog to digital by a converter 327 before being passed to the processor. Although not shown, numerous of the vehicle components and auxiliary components in communication with the VCS may use a vehicle network (such as, but not limited to, a CAN bus) to pass data to and from the VCS (or components thereof).

It will be appreciated that the processor 303 can perform the methods described herein or steps of the methods described herein. In an example, the processor 303 can determine and/or send signals to control charging and discharging the battery to a battery target state of charge (SOC) with the target SOC varying in response to at least a scheduled or predicted storage. In an example, the processor 303 can determine and/or send signals to store a state of charge profile which includes the target SOC value as a function of at least one of ambient temperature, projected energy usage, and storage time. In an example, the processor 303 can determine and/or send signals to store a predicted weekday driving pattern energy usage and to modify the target SOC in response to a current weekday. In an example, the processor 303 can determine and/or send signals to charge the battery based on a battery charging start time such that the battery is charged to the target SOC within a designated time period before scheduled operation of the vehicle. In an example, the processor 303 can determine and/or send signals to discharge the battery to an electrical grid to reduce a current SOC to the target SOC. In an example, the processor 303 can determine and/or send signals to partition battery energy usage into a plurality of time based patterns. In an example, the processor 303 can determine and/or send signals to set the target SOC storage point to at least 90% when ambient temperature is less than 0° C. In an example, the processor 303 can determine and/or send signals to vary the target SOC in response to a predicted average daily temperature during the scheduled or predicted storage time.

Outputs to the system can include, but are not limited to, a visual display 304 and a speaker 313 or stereo system output. The speaker is connected to an amplifier 311 and receives its signal from the processor 303 through a digital-to-analog converter 309. Output can also be made to a remote BLUETOOTH device such as PND 354 or a USB device such as vehicle navigation device 360 along the bi-directional data streams shown at 319 and 321 respectively.

In one illustrative embodiment, the system 301 uses the BLUETOOTH transceiver 315 to communicate 317 with a user's nomadic device 353 (e.g., cell phone, smart phone, PDA, tablet, laptop, key fob or any other device having wireless remote network connectivity) or computer. The nomadic device can then be used to communicate 359 with a network 361 outside the vehicle 331 through, for example, communication 355 with a cellular tower 357. In some embodiments, tower 357 may be a WiFi access point. Exemplary communication between the nomadic device and the BLUETOOTH transceiver is represented by signal 314.

Pairing a nomadic device 353 and the BLUETOOTH transceiver 315 can be instructed through a button 352 or similar input. Accordingly, the processor, e.g., a CPU, is instructed that the onboard BLUETOOTH transceiver will be paired with a BLUETOOTH transceiver in a nomadic device.

Data may be communicated between processor 303 and network 361 utilizing, for example, a data-plan, data over voice, or DTMF tones associated with nomadic device 353. Alternatively, it may be desirable to include an onboard modem 363 having antenna 318 to communicate 316 data between processor 303 and network 361 over the voice band. The nomadic device 353 can then be used to communicate 359 with a network 361 outside the vehicle 331 through, for example, communication 355 with a cellular tower 357. In some embodiments, the modem 363 may establish communication 320 with the tower 357 for communicating with network 361. As a non-limiting example, modem 363 may be a USB cellular modem and communication 320 may be cellular communication.

In an illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 353 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), and Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 353 is replaced with a cellular communication device (not shown) that is installed to vehicle 331. In yet another embodiment, the nomadic device 353 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 303. In the case of certain temporary data, for example, the data can be stored on the HDD or other storage media, e.g., memory 307, until such time as the data is no longer needed.

Additional sources that may interface with the vehicle include a personal navigation device 354, having, for example, a USB connection 356 and/or an antenna 358, a vehicle navigation device 360 having a USB 362 or other connection, an onboard GPS device 324, or remote navigation system (not shown) having connectivity to network 361. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the processor could be in communication with a variety of other auxiliary devices 365. These devices can be connected through a wireless 367 connection or wired 369 connection. Auxiliary device 365 may include, but are not limited to, personal media players, wireless health devices, portable computers, and the like.

Also, or alternatively, the processor could be connected to a vehicle based wireless router 373, using for example a WiFi 371 transceiver. This could allow the processor to connect to remote networks in range of a local router, e.g., router 373.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

It will be appreciated that the VACS or VCS can perform the methods described herein or individual steps in the methods. For example, VACS or VCS can determine and/or send signals to control charging and discharging the battery to a battery target state of charge (SOC) with the target SOC varying in response to at least a scheduled or predicted storage; to store a state of charge profile which includes the target SOC value as a function of at least one of ambient temperature, projected energy usage, and storage time; to store a predicted weekday driving pattern energy usage and to modify the target SOC in response to a current weekday; to charge the battery based on a battery charging start time such that the battery is charged to the target SOC within a designated time period before scheduled operation of the vehicle; to discharge the battery to an electrical grid to reduce a current SOC to the target SOC; to partition battery energy usage into a plurality of time based patterns; to set the target SOC storage point to at least 90% when ambient temperature is less than 0° C.; or to vary the target SOC in response to a predicted average daily temperature during the scheduled or predicted storage time.

Figure 11:
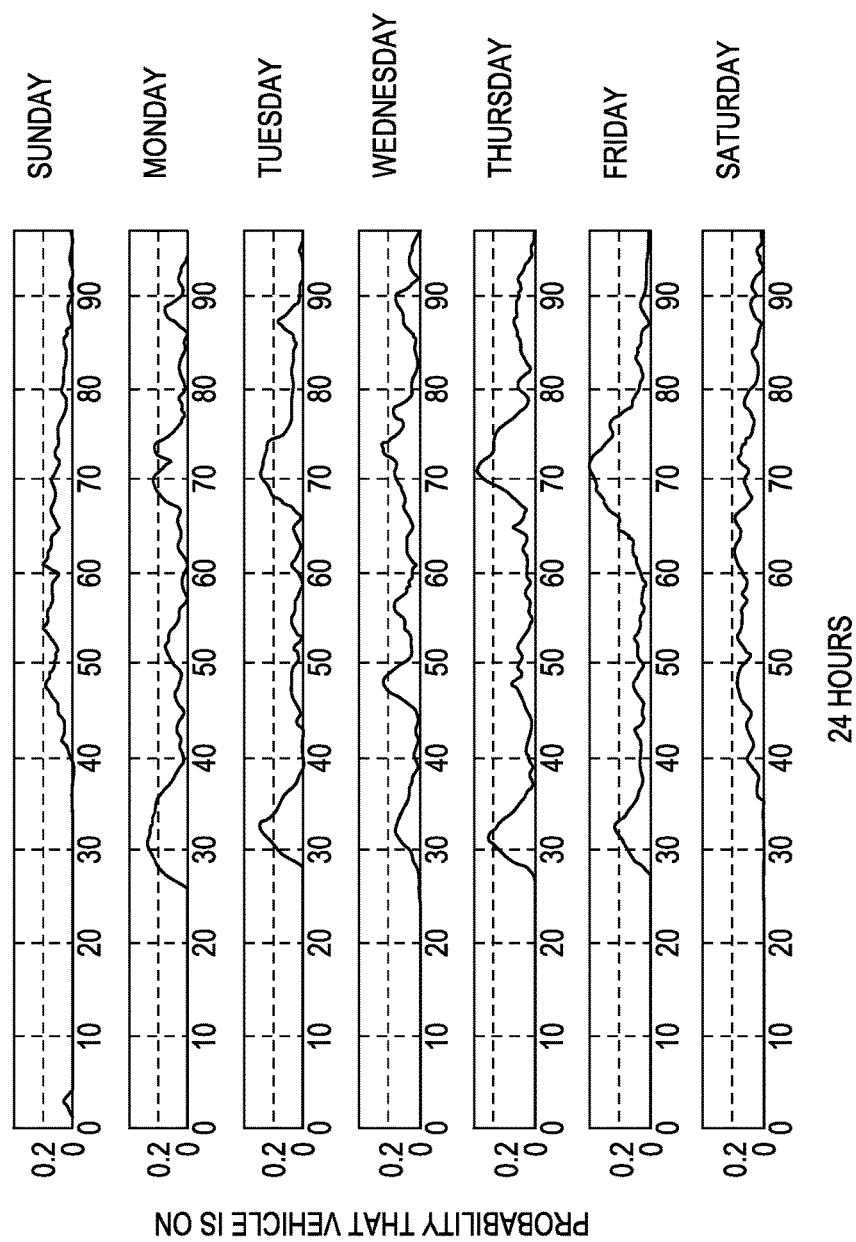
FIG. 11 shows a graph of vehicle use, specifically, an example of an electrical power-on probability matrix.
Figure 12:
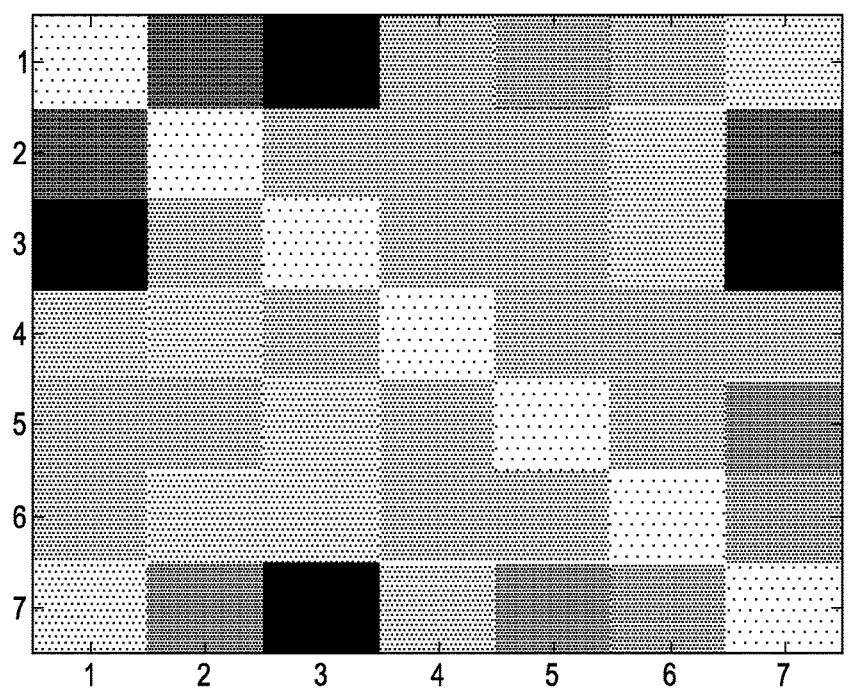
FIG. 12 shows a graph of a vehicle use patterns, specifically, an example of a day of week similarity matrix.
Figure 13:
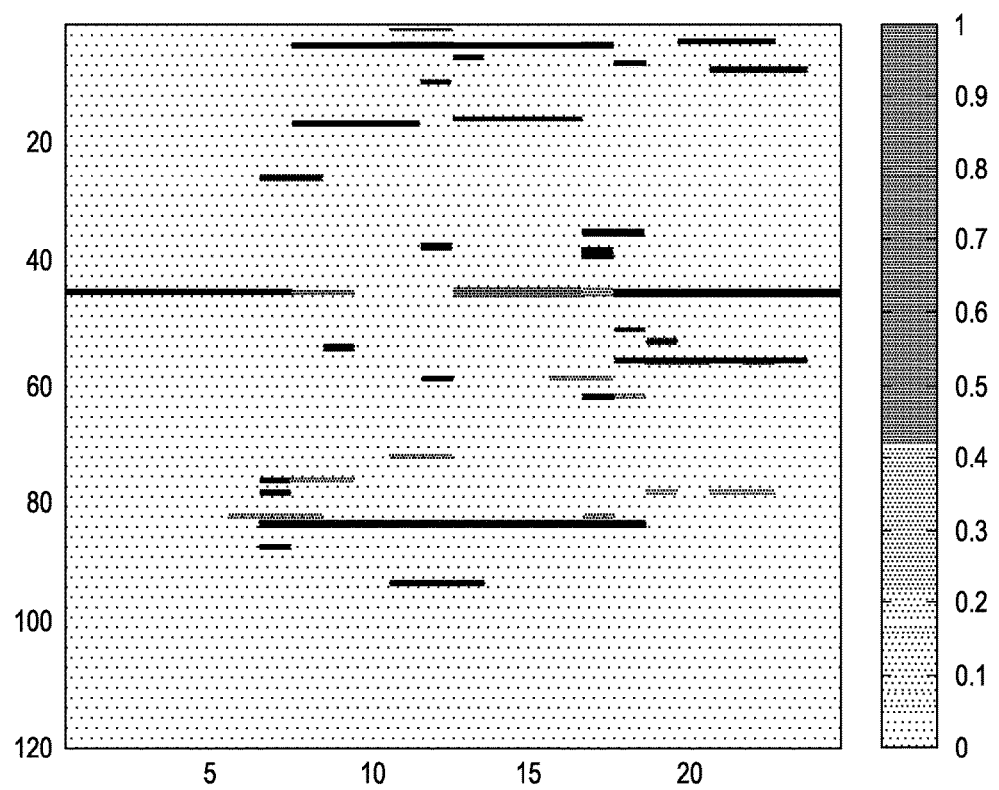
FIG. 13 shows a graph of vehicle use, specifically, drive probable locations and stop duration patterns.

The illustrative examples use inputs such as, but not limited to, location information (GPS), vehicle speed and time as context information to build a model of driver behavior and related vehicle use patterns. Discrete regions are defined in 2-D time space spanned by DOW (Day of week) and TOD (Time of Day) sets, which can be derived from time, and each DOW and TOD set is associated with a transition probability matrix among frequent stop locations. The system automatically identifies stop locations and trips made between locations and generalizes the relationships between locations for predictive purposes. It supports single or multiple-steps-ahead prediction with single or multiple destination predictions. Supportive trip information such as trip distance, trip duration, and stop duration at the destination is also predicted as needed. This trip information can be used to determine the desired or target state of charge for vehicle usage and battery storage state to control battery charging and discharging to dynamically manage battery capacity. Examples of vehicle usage data are shown in FIGS. 11, 12, and 13 described in more detail below.

Figure 4:
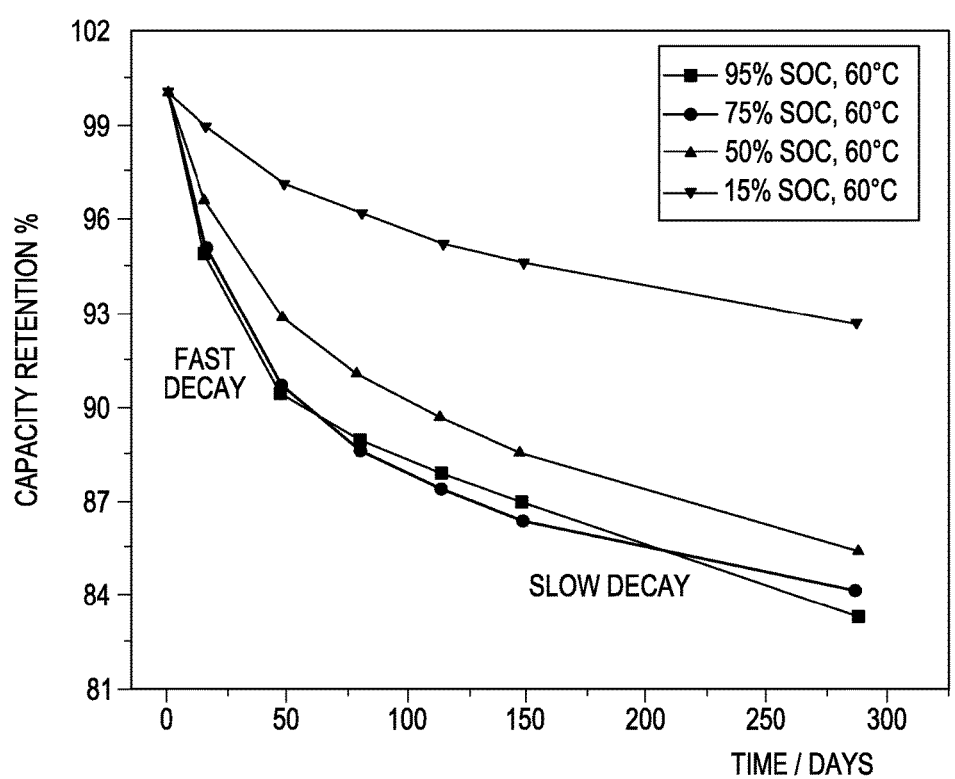
FIG. 4 shows a graph of battery capacity loss verses state of charge, in an example.

FIG. 4 shows the capacity changes of a generic battery or battery cell for a vehicle (an electric vehicle or a hybrid electric vehicle). In an example, the battery cell may be a 24.5 Ah energy cell, with an elevated storage temperature of 60° C. This graph shows a single battery type in storage at a constant elevated temperature, here 60° C. A general trend is that with the same storage temperature and elapsed time, a higher state of charge (SOC) at the start of storage may result in a greater change of capacity as compared to a lower SOC at the beginning of the storage period under the same environmental conditions. It is noted that the rate and behavior of the battery capacity may be battery specific. Degradation over such storage periods may result in loss of battery capacity to store electrical charge. Batteries, e.g., lithium batteries, from different suppliers have different responses to the same storage conditions. Even different cell lines or models from the same supplier may exhibit very distinct characteristics because of the difference in cell design, chemistry, and the quality of raw materials. Accordingly, it may be desirable under long term storage, e.g., greater than 10 days, and particularly more than one month, to set the target or desired state of charge at less than full charge, e.g., 20% or less of a full state of charge or 15% or less of a full state of charge. In various examples, long term storage is greater than a period of two weeks, 10 days, or a month without driving the vehicle.

Figure 5:
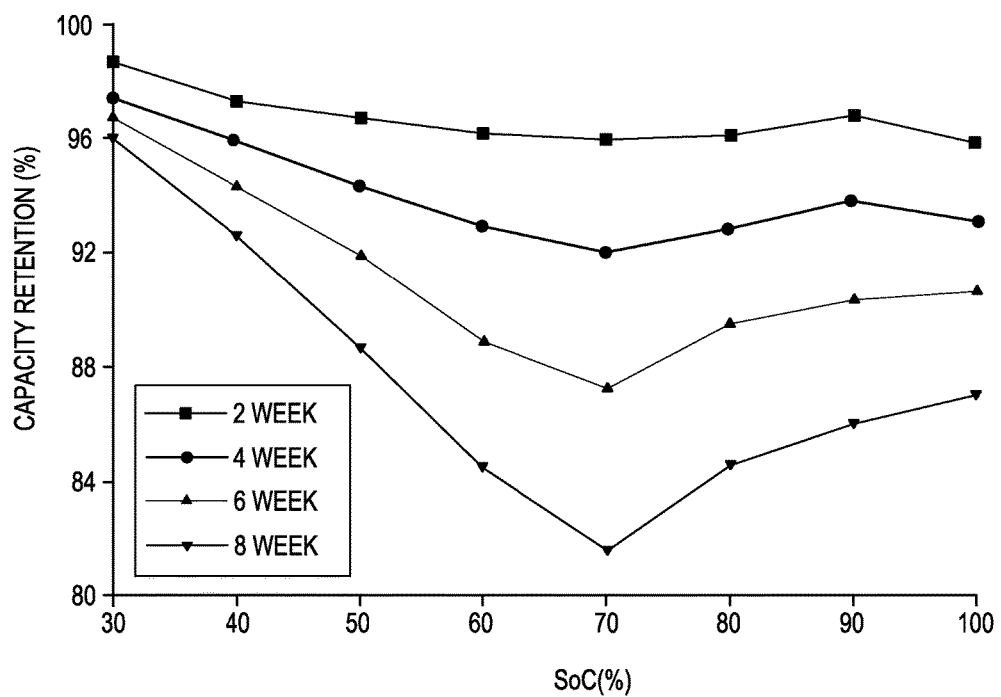
FIG. 5 shows a graph of battery capacity loss verses state of charge, in an example.

FIG. 5 shows the capacity retention of a 15 Ah battery as a function of battery SOC at the beginning of storage for representative storage periods of two, four, six, and eight weeks at a constant temperature, e.g., 55° C. Note that the battery and storage conditions illustrated in FIG. 5 are different from those represented in FIG. 4. As illustrated in FIG. 5, the capacity retention profiles and associated battery capacity that results may vary based on the length of the storage period as well as the battery SOC at the beginning of the storage period. Such profiles may be stored in a look-up table or database stored in memory and accessibly by the PCM or other vehicle controller to determine a desired SOC at the beginning of a scheduled or anticipated storage period to manage battery capacity. As illustrated in FIG. 5, various ranges of battery SOC may exhibit more significant degradation, and may therefore be avoided. As shown in FIG. 5, the SOC range having a greater impact on battery capacity for a six-week or eight-week storage period is around 70%, instead of at a higher SOC. The range can be considered to be from about 60% to about 80%. These SOC should be avoided for extended storage periods. As shown, the SOC for long term storage should be about 30% or less for most long term storage.

In anther example, the SOC range having a greater impact on battery capacity for a six-week or eight-week storage period is around 40-50%, instead of at a higher SOC. Accordingly, the favorable range is greater than zero SOC to about 40% and from about 50% to about 100% SOC for this battery being stored for the six-week or eight-week storage period. The two-week storage period has first degradation between about 40% and about 45% SOC and second degradation at about 80% SOC to about 100% SOC. The four-week storage period has first degradation between about 40% and about 50% SOC and a second degradation at about 63% SOC to about 100% SOC.

Figure 6:
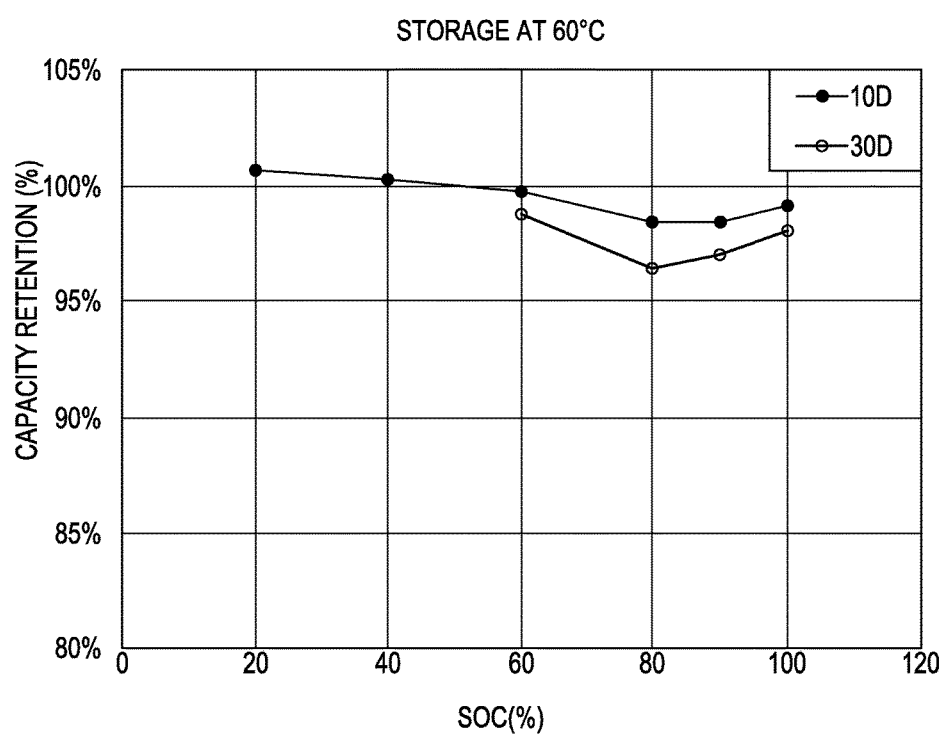
FIG. 6 shows a second graph of battery capacity loss verses state of charge, in an example.

FIG. 6 shows the capacity retention of a third battery, which is different than either of the FIG. 4 or 5 examples, at a constant temperature, here 60° C., for 10 days and 30 days. As shown, the capacity retention of this battery is significantly reduced at the SOC of about 80%. Thus, the unfavorable SOC for long term storage of this battery is around 80%. It may be desirable to avoid the range of SOC target values of between about 75-85%, i.e. 80%+/−5%, or 60% to 90%, e.g., +/−10% or 20%. The favorable ranges for SOC at storage for this type of battery are from about zero % to the lower value of the unfavorable SOC range or point and from maximum unfavorable value to about 100% SOC.

The examples of FIGS. 4-6 show that data regarding the battery retention capacity for the particular battery in the vehicle is used to determine battery state during storage. Such data can be loaded into memory, e.g., memory 307, through any of the machine communication methods described herein, e.g., communicated over a network or input by a user through an interface. This data may define a favorable SOC profile for a particular battery or energy cells of a particular hybrid electric vehicle when the vehicle is being stored to alleviate the detrimental effects of a particular SOC on the battery capacity retention and battery life. As a result, storage test data is integrated into control strategies (described herein) to alleviate battery cell degradation to manage battery capacity and resulting battery life. In an example, the favorable SOC profile may be pre-defined based on the actual battery cells used to electrically power the HEV. The favorable SOC profile may also be updated when new data become available through communication channels with the vehicle as described herein. An unfavorable SOC profile may also be stored and may consist of a limited range or ranges or discrete SOC values at which storage of the battery results in decreased battery performance, e.g., battery capacity retention. The present methods and systems may use the favorable SOC profile or the unfavorable SOC profile to control the SOC during non-use of the vehicle, e.g., overnight storage or long term storage, to alleviate battery capacity losses that may be associated with a specific SOC.

Figure 7:
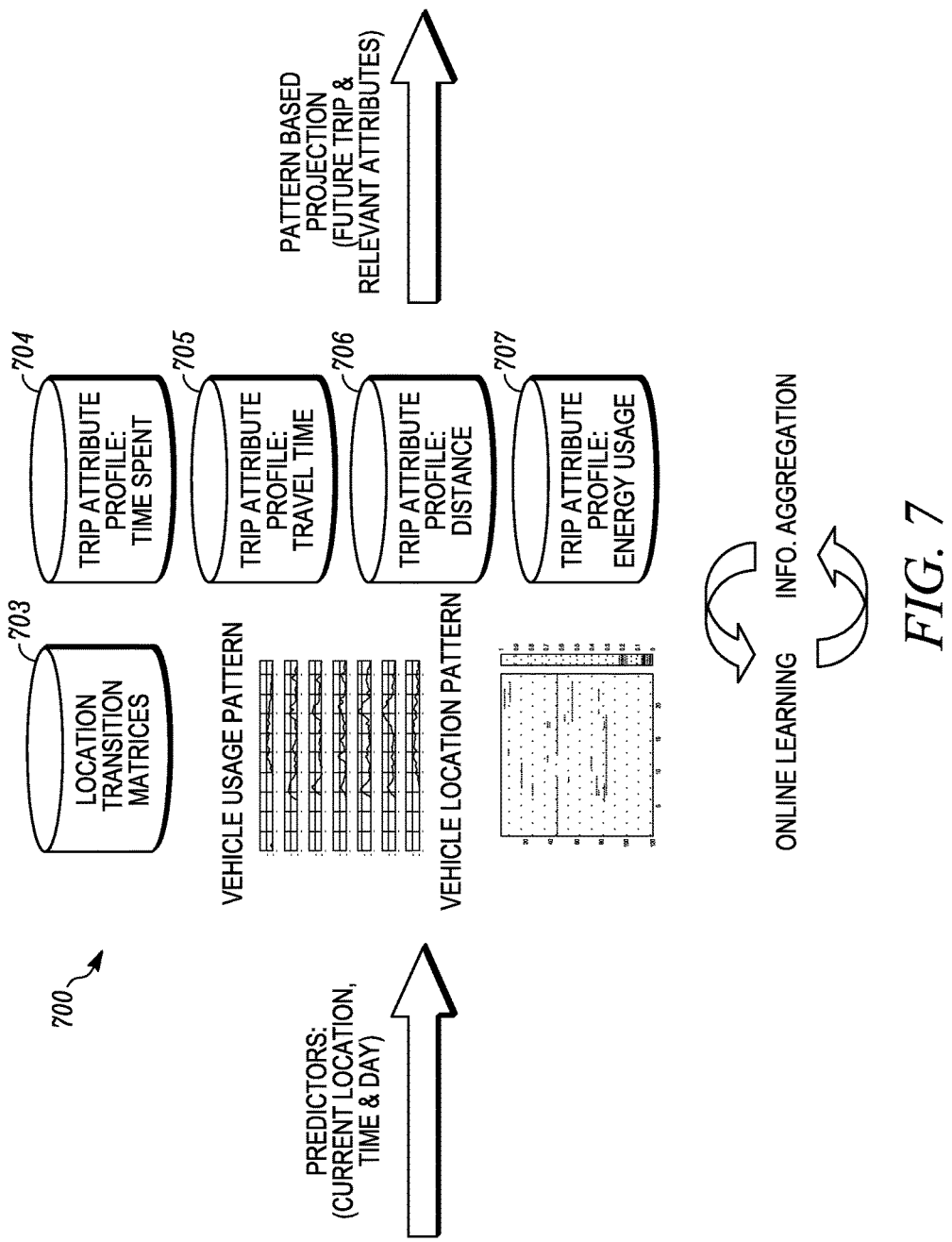
FIG. 7 shows a schematic representation of a vehicle use determination system, in an example.

FIG. 7 shows a schematic representation of a vehicle use determination system 700. Vehicle use determination system 700 can receive inputs from hybrid-electric vehicle 102 and store the input data in any of hybrid-electric vehicle 102, nomadic device 353, and/or computing system 301. These inputs can be used to store various data related to vehicle usage in associated databases, e.g., location transition matrices, data associated with trips. It will be recognized that the databases are stored in tangible non-transitory memory or computer readable devices, e.g., any of the memory devices described herein. Any movement of data or processing of data can be performed by a processor or other logic device. The input data can be received, at 701, from sensors or input devices in the vehicle or from external sources and can include the current location of the vehicle, e.g., from a GPS device or other telematics, the day and the time. The received data can be further processed, e.g., subjected to instructions being executed by a computing machine, to produce location matrices and trip profiles. Examples of trip profiles can include time spent, travel time, distance, and energy usage. This data can be stored in memory devices 703, 704, 705, 706, and 707. The data can be displayed, either on an in-vehicle display or on an external display in graphical form. Using this data that is aggregated and subject to various processing, e.g., online learning, vehicle usage patterns, e.g., future trips and relevant attributes of the predicted future trips can be output. Further examples of future use prediction can be found in U.S. patent application Ser. No. 13/400,304, published as 2013/0218379, and U.S. patent application Ser. No. 13/714,919, all commonly owned by the present assignee. These applications are hereby incorporated by reference for any purpose. However if the disclosure in these applications conflicts with the explicit teachings of the present application, then the present application controls.

Figure 8:
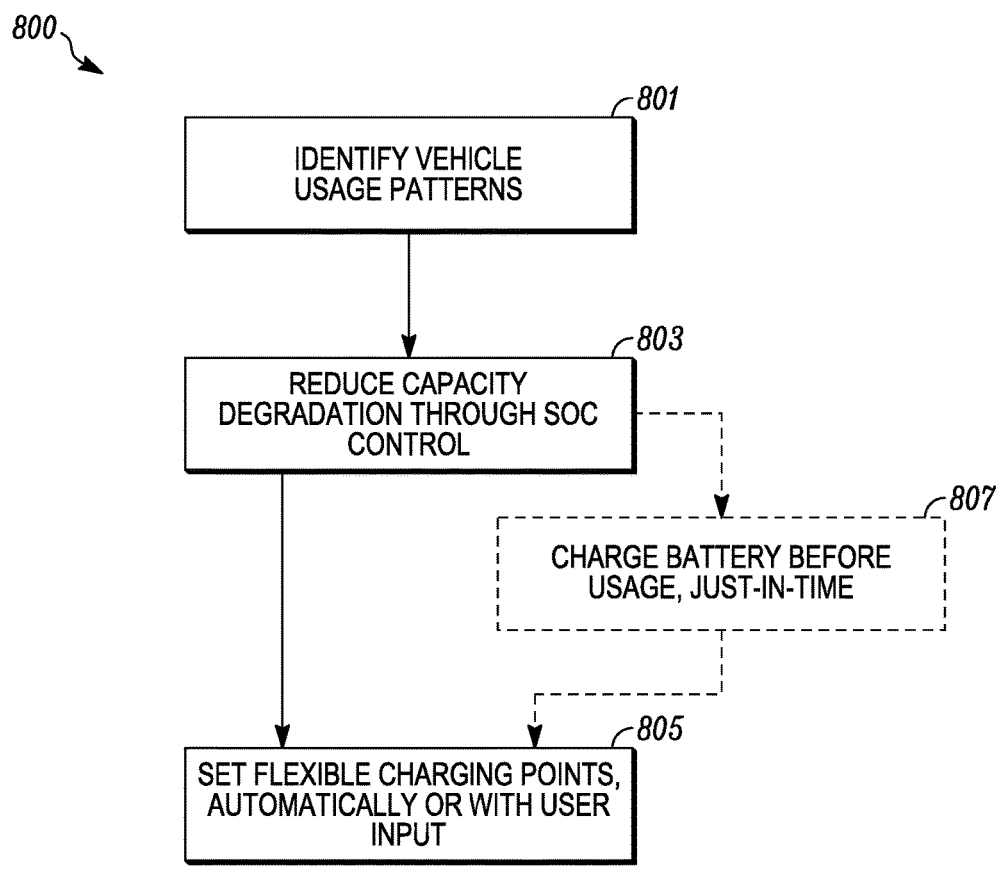
FIG. 8 shows a method for battery capacity loss alleviation, in an example.

FIG. 8 shows a method 800 for battery capacity loss alleviation. At 801 vehicle usage patterns are identified. Such usage patterns may be the usage patterns shown in any of FIGS. 11-13 or the data shown in FIG. 7. At 803, the vehicle's state of charge (SOC) is controlled to manage the battery capacity. The battery capacity behavior can be attributable to a certain battery type, e.g., lithium battery with NCM cathodes, a battery with an NCM-LMO cathode or others. In some batteries the type of cathode contributes to the battery capacity behavior at various temperatures and SOC, which can be represented as unfavorable. As a result, each battery type and configuration may have an individual battery capacity management profile that may be represented by unfavorable or favorable SOC values or ranges. In an example, the target SOC storage point is at least 90% when ambient temperature is less than 0° C. At 805, the flexible charging points or target SOC can be set. These charging points would be in the favorable charging profile and not be at a target SOC that reduces battery capacity during storage or results in an increase in battery capacity degradation relative to other states of charge. In an example, the processing circuitry of the vehicle automatically sets the flexible charging points in response to one or more current or predicted vehicle or ambient operating conditions. In an example, the user selects the charging points from available charging points presented to the user by the computing systems on board the vehicle or external computing systems that are in communication with the vehicle.

At 807, an optional step in the method 800 is shown. The battery may be stored at a SOC that alleviates battery capacity loss. However, such an SOC may not provide enough charge for the next anticipated use, or may result in the battery being stored during the next period at an SOC that accelerates battery capacity loss. The battery is charged so that it receives adequate charge for the next time period, e.g., day, drive to work, or other time period, just in time for vehicle use. Just in time can be shortly before the vehicle is used. Just in time can include finishing charging with 15 minutes of predicted use, within 10 minutes of predicted use or less, for example. The actual charge completion time may be determined based on a number of factors, such as ambient temperature, electricity cost for a particular location or time of day, etc. depending on the particular application and implementation. The time of predicted use can be determined by the vehicle computing systems based on prior vehicle use. In an example, the user can set the vehicle use time or "go time". The user can override the automatically determined times for just in time charging. Once the just in time charging is set, the process moves to step 805 where the charging points in terms of SOC are set.

Figure 9A:
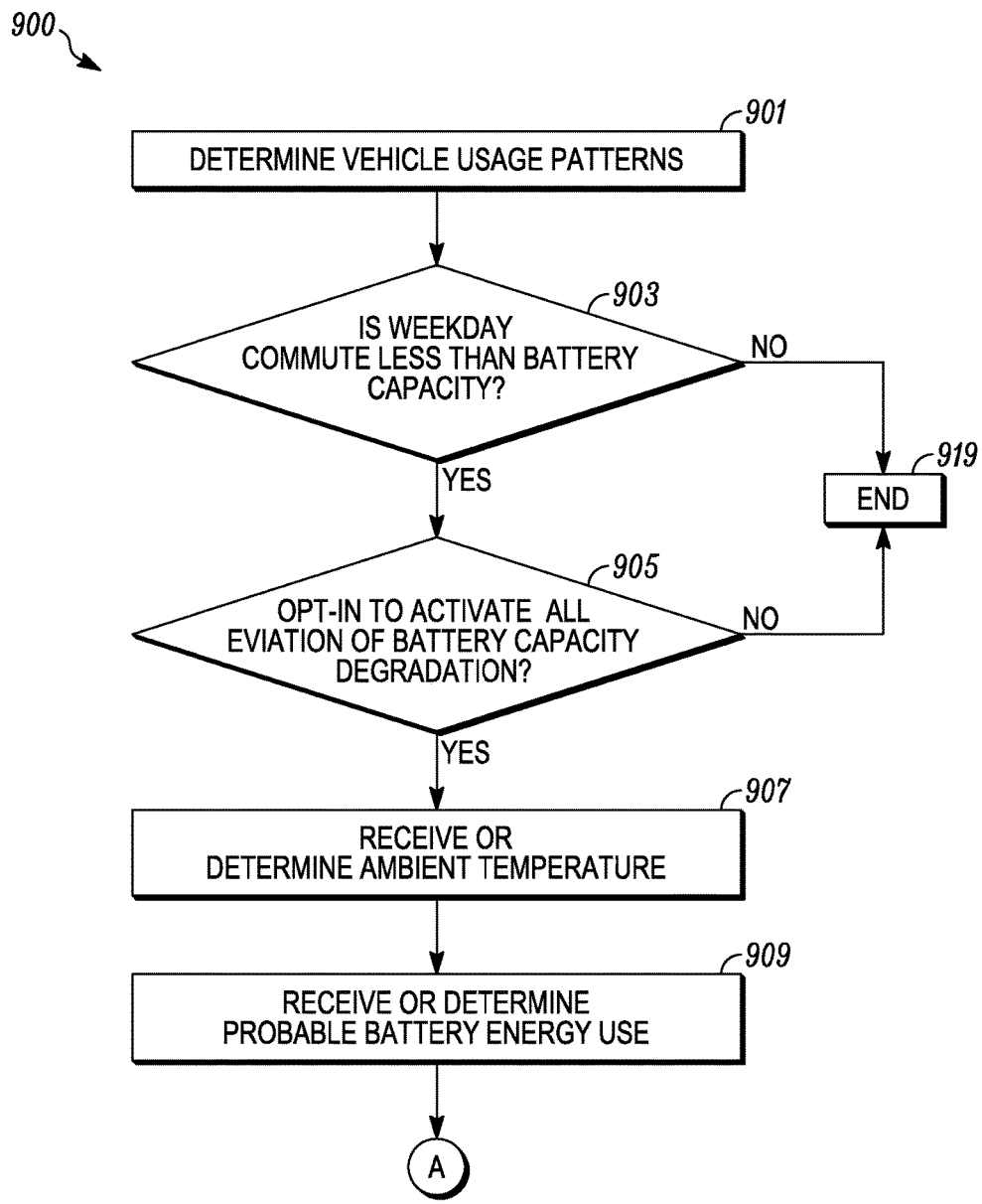
FIGS. 9A and 9B show a method for battery capacity loss alleviation, in an example.
Figure 9B:
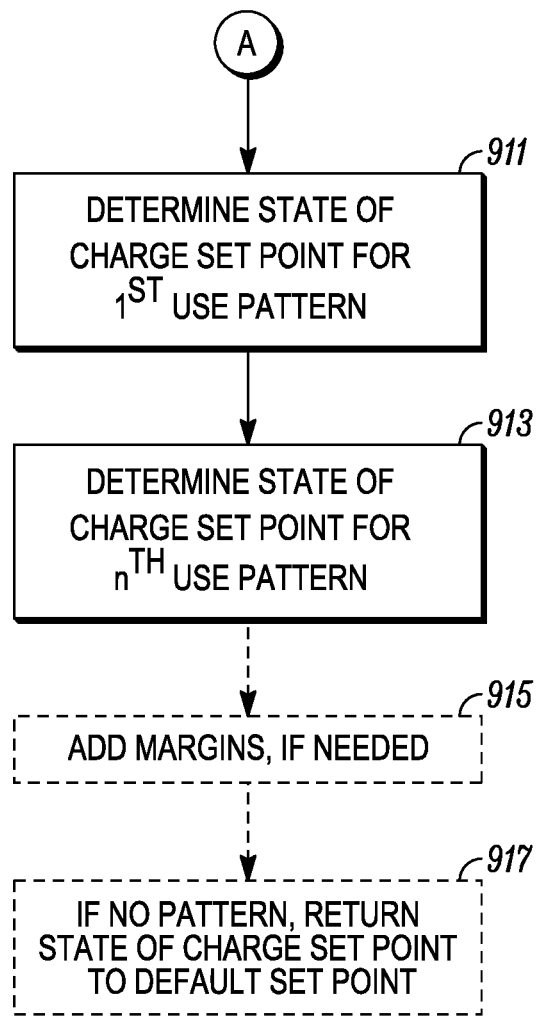

FIGS. 9A and 9B show an example method for battery capacity loss alleviation 900. At 901, vehicle usage patterns are determined. The vehicle usage patterns can be determined by onboard sensors and processing devices. The vehicle usage data can be sent from the vehicle for processing to determine vehicle usage patterns, e.g., the patterns shown in FIGS. 11-13. In an example, the vehicle may have sufficient computing power to determine vehicle usage patterns on-board the vehicle. At 903, it is determined whether the weekday commute is less than the battery capacity. If it is not, then the process ends at 919. If the weekday commute is less than the battery capacity, then the process moves to step 905. At 905, the user is asked if the vehicle should opt-in to activate the battery capacity degradation alleviation systems and methods. If no, then the method ends at 919. When the method for battery capacity loss alleviation ends, the vehicle will continue to collect usage data such that accurate, current vehicle usage data are available if the user opts into the battery capacity loss alleviation or dynamic battery capacity management method at a later time.

Once the user decides to opt-in to the active battery capacity management method, the ambient temperature is determined on-board the vehicle or received at the vehicle from an external source, at 907. The temperature at which the battery is stored can be a parameter that affects the battery capacity at a specific SOC as previously illustrated and described. At 909, the probable energy use for the vehicle is determined or received. The vehicle usage data determination can be done using on-board vehicle sensors. Processing of the sensed data can be done on the vehicle or at a computing system remote from the vehicle. It will be recognized that there may be a plurality of different use patterns, e.g., day-to-day, days of week, week days versus weekends, work days versus days off, different users of the vehicle etc. At 911, the state of charge set point for a first use pattern is determined. This can be repeated until the state of charge set point for a plurality of use pattern can be determined up to an nth use pattern is determined at 913.

Additional optional steps can be performed. At 915, margins can be added to the SOC set point. The margins can be calculated to meet use situations that are likely to fall outside the use case by a certain amount. At 917, if there is no use pattern that is determined for a certain time period then the SOC charging point will be set at a factory, vehicle default point.

Figure 10:
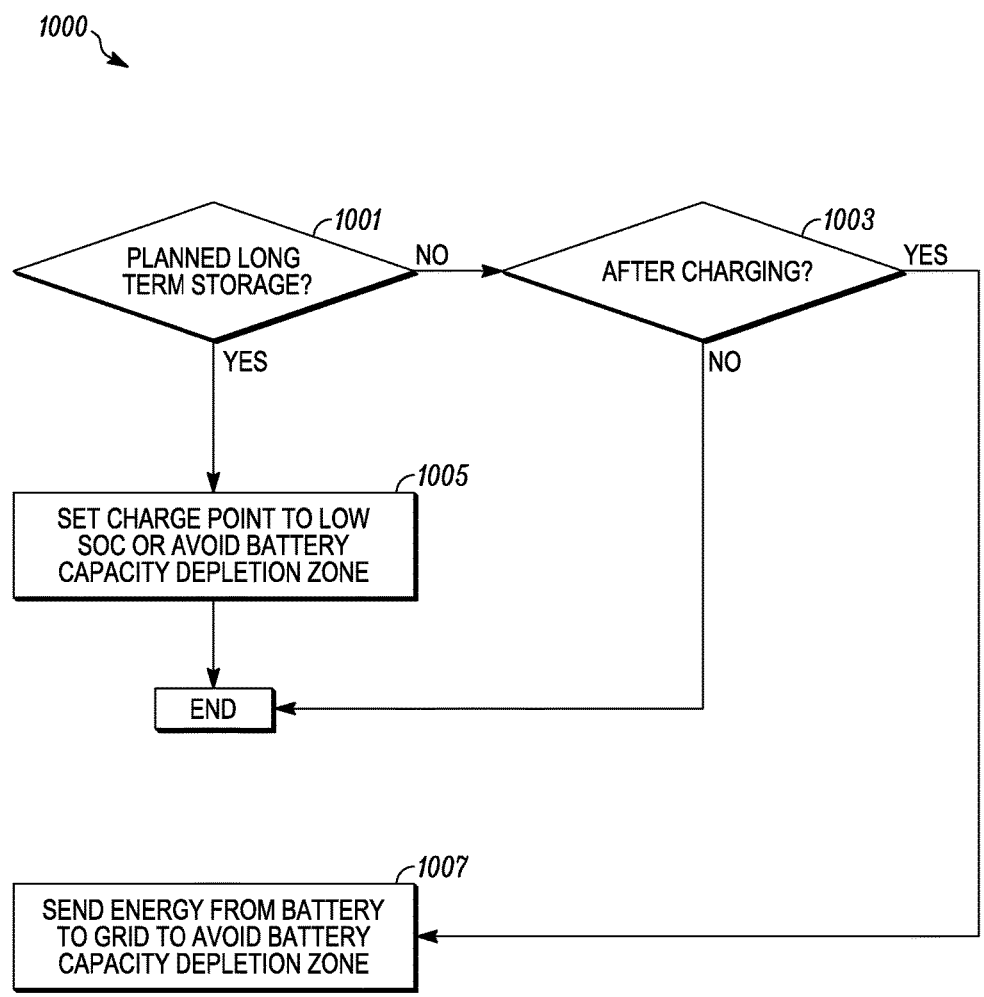
FIG. 10 shows a method for battery capacity loss alleviation, in an example.

FIG. 10 shows a method for battery capacity management 1000 for a predicted or scheduled storage period. At 1001, it is determined whether long term storage is planned. In an example, the user inputs that the vehicle is to be stored for a significant period of time. In another example, the location of the vehicle, its length of time between uses, or deviation from its past use history can indicate that the vehicle is likely to be in a long-term storage. If the long-term storage is not planned, it is determined whether this storage is after charging, at 1003. If not, then the process ends. If it is determined that this unplanned storage is after charging and the battery is at an unfavorable SOC higher than a more favorable SOC, then battery discharging may begin to move the battery out of the unfavorable profile and avoid the battery capacity depletion zone, at 1007. If the vehicle is currently coupled to a charging source, energy may be transferred from the battery to the charging source or utility grid to reduce to the SOC to a desired or target SOC. If the vehicle is not currently connected to a charging source, or if the charging source is not capable of accepting energy from the vehicle battery, the VCM may automatically control one or more vehicle accessories or other electrical devices to increase the electrical load and discharge the battery to a desired SOC or within a desired SOC range.

At 1005, if the long-term storage is planned, e.g., at an airport or during a planned vacation, then the SOC set point can be set lower or at a point that avoids the battery capacity depletion range or point. Thus, when the vehicle is parked or stored, then the battery is stored at an SOC that manages the battery capacity within certain parameters or constraints.

FIG. 11 shows seven graphs of vehicle usage, specifically vehicle electrical power (e.g., key) "on" probability. The graphs are shown Sunday through Saturday from top to bottom, respectively. In each daily graph the X-axis is a 24-hour time period broken down into a range of 0-100. In each daily graph the Y-axis is the probability that the electrical power is in the "on" position in the vehicle. These probabilities are determined based on sensed, stored, and processed data. The data can be sensed by vehicle sensors. This data can be used in the present systems and methods to determine storage time periods, charging start time, or charging time periods. For example, the electrical power "on" probability can be used to determine when to start charging or if a long non-use time is beginning to alter the state of charge of the battery. The vehicle "on" beginning, e.g., between about 25-30 for the weekdays and about 35-45 on Saturday and Sunday, is the time at which the vehicle should be charged to a SOC that will most likely provide enough charge for operation of the vehicle for either the length of trip to next charge or throughout the entire day.

FIG. 12 is a matrix showing the degree of similarity of vehicle usage data for the days of week. The matrix or similar categorization or binning of data may be used to select a desired or target SOC. A similarity matrix or similar data analysis may be generated based on historical vehicle usage data, such as the power-on data as illustrated and described with reference to FIG. 11, for example. In the example matrix illustrated in FIG. 12, the days of week Sunday-Saturday are represented as 1-7, resulting in a symmetrical 7×7 matrix. Lighter colors represent more similarity or higher correlation between usage patterns on the two days corresponding to the matrix position or coordinates, i.e., white represents highest, perfect, or exact similarity, while black indicates near zero similarity. As such, the white squares correspond to the day on the same day on the X-axis and the Y-axis. The darker the color the lower the similarity. The data represented by the FIG. 12 matrix can be used in the present systems and methods when determining storage time periods or charging time periods, including start and stop times as well as the needed SOC. For example, a similarity matrix can be used to select a previously determined start charging time, end charging time or a required SOC or if a long non-use time is beginning to alter the state of charge of the battery using the similarity data.

FIG. 13 shows a vehicle location and probability that a vehicle is parked. The Y-axis shows unique vehicle locations. These vehicle locations can be determined using vehicle location devices, e.g., a global positioning system such as GPS (North America), Russian Global Navigation Satellite System (GLONASS), the European Union's Galileo positioning system, India's Indian Regional Navigational Satellite System and China's Compass navigation system. The X-axis shows time of day with the color coding indicating the probably that the vehicle is not in motion and parked, e.g., vehicle not "on" or the electrical power is "off." This data can be used in the present systems and methods to determine storage time periods, charging start time or charging time periods.

Battery capacity can be affected by many factors that can be categorized as main factors, controllable factors, and use cases. The main factors are addressed herein and can include battery SOC at the beginning of a non-use period, temperature, and elapsed time. The unfavorable SOC values are typically higher SOC values, e.g., greater than 60% and up to 100%. Similarly, higher temperatures generally have a greater effect on battery capacity degradation, e.g., greater than 50° C. or over 60° C., +/−5° C. Another main factor is the elapsed storage time at a specific beginning SOC. However, this disclosure recognizes that SOC is also a controllable factor that can be used to manage the affect of other parameters on battery capacity, such as storage time and temperature. While reduction of battery capacity may be alleviated by storing the battery at a lower SOC, the lower SOC may not provide the charge required for predicted vehicle usage and, hence, does not maintain the advantages of an electric vehicle. The use cases can include long term storage, e.g., a trip or vacation. The present disclosure provides pre-trip charge (SOC) control to the user to manage battery capacity subject to various constraints. To achieve a desired SOC to manage battery capacity during storage, the vehicle can discharge some of its power with the desired SOC selected such that there is enough power to operate the vehicle at the end of the storage. Another storage type is daily parking of the vehicle, which can be identified by the use cases determined by the vehicle usage over time. Using these factors and use cases, the battery capacity can be managed to improve overall battery performance.

The present application describes systems and methods to intelligently manage battery capacity through control of desired or target SOC and charging or discharging the battery to obtain the desired SOC based on predicted or scheduled use patterns and storage or non-use periods, which may extend the useful life of the battery. It is predicted that batteries for future vehicles will be designed closer to actual power/energy capacity required for a specific vehicle and its usage. As a result, active battery life control may become more and more important. By utilizing driver trip profiling, it is possible to affect a reduction in battery capacity loss. This will contribute to the batteries maintaining high performance and may result in higher customer satisfaction with their PHEVs or other electric vehicles. Customer preferences may also be accommodated by providing an option, which may be triggered by the user or automatically by the system, to customize dynamic battery capacity operation or to deactivate dynamic battery capacity management entirely.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling an electric vehicle having a battery to propel the vehicle to dynamically manage battery capacity, comprising:
    charging and discharging the battery to a battery target state of charge (SOC), the target SOC varying in response to at least a scheduled or predicted vehicle storage time and ambient temperature during scheduled or predicted vehicle storage time with actual SOC being a function of ambient temperature.

2. The method of claim 1, further comprising storing a state of charge profile which includes the target SOC as a function of at least one of the ambient temperature, projected energy usage, and storage time.

3. The method of claim 1, further comprising storing a predicted weekday driving pattern energy usage, determining a predictive matrix of vehicle use, and modifying the target SOC in response to a current weekday.

4. The method of claim 1, further comprising charging the battery from a storage target SOC, which is dependent on the ambient temperature during the vehicle storage time, to a use SOC based on a battery charging start time such that the battery is charged to the target SOC within a designated time period before scheduled operation of the vehicle.

5. The method of claim 1, further comprising discharging the battery to an electrical grid to reduce a current SOC to the target SOC to reduce battery capacity degradation while a vehicle is a non-use period.

6. The method of claim 1, further comprising partitioning battery energy usage into a plurality of time based patterns.

7. The method of claim 1, wherein the target SOC for a traction battery during vehicle storage is at least 90% when ambient temperature is less than 0° C.

8. The method of claim 1, wherein the target SOC varies in response to a predicted average daily temperature during the scheduled or predicted storage time.

9. A method, comprising:
    storing vehicle usage patterns including at least a first vehicle usage pattern with long-term storage; and
    charging or discharging a vehicle battery based on a desired SOC from a stored state of charge (SOC) profile relating SOC to capacity of the vehicle batter, temperature for the first vehicle usage pattern, and sensed ambient temperature during vehicle storage, with the SOC being at least 90% when ambient temperature is less than 0° C.

10. The method of claim 9, wherein the desired SOC includes a default SOC for a second vehicle usage pattern that includes an extended long-term storage.

11. The method of claim 9, wherein storing vehicle usage patterns includes storing a long-term storage pattern, and determining when a long-term storage will occur, and the desired SOC corresponds to a charge-sustaining point in the SOC profile.

12. The method of claim 9, wherein charging or discharging comprises discharging energy back to a utility grid to achieve the desired SOC, the desired SOC based on enough charge to start an engine.

13. The method of claim 9, further comprising sending a command to increase the desired SOC from a desired SOC associated with long term storage and charge the battery within a designated period before a predicted or scheduled end of storage.

14. A vehicle comprising:
    a battery to power an electric motor to propel the vehicle, wherein the battery includes a state of charge (SOC);
    a memory storing a battery temperature, projected energy usage and storage time; and
    a processor operatively coupled to the memory, the processor controlling charging or discharging of the battery to an SOC storage point for the battery using the battery temperature, projected energy usage, ambient temperature during vehicle storage, and storage time to manage battery capacity during storage.

15. The vehicle of claim 14, wherein the memory comprises a state of charge profile that includes a relationship between SOC, storage time, and battery capacity.

16. The vehicle of claim 15, wherein the memory is updated through an external computing device after the battery is deployed, and wherein the processor is configured to generate a display of a similarity matrix showing probability of actual vehicle use matching predicted vehicle use including predicted storage time.

17. The vehicle of claim 15, wherein the processor is programmed to receive the projected energy usage that includes a predicted weekday driving pattern energy usage and to modify the SOC storage point based on predicted future use and storage cycles.

18. The vehicle of claim 17, wherein the processor is to determine a charging start time to achieve a target SOC different from the SOC storage point for vehicle use before predicted or scheduled operation of the vehicle.

19. The vehicle of claim 15, wherein the processor is to determine a feedback charge amount to send to an electrical utility grid from the battery to achieve the SOC storage point and to avoid a battery depletion zone.

20. The vehicle of claim 14, wherein the processor is to partition the energy usage into a plurality of time based patterns and is to set the SOC storage point to at least 90% of maximum SOC when the battery temperature is less than 0° C.

* * * * *